United States Patent
Rutkowski et al.

(10) Patent No.: US 9,013,127 B2
(45) Date of Patent: Apr. 21, 2015

(54) DRIVE SYSTEM WITH A DIRECT CURRENT MOTOR BRAKE

(71) Applicant: Ford Global Technologies, LLC, Dearborn, MI (US)

(72) Inventors: Brian D. Rutkowski, Ypsilanti, MI (US); David John Rutkowski, Grosse Ile, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 238 days.

(21) Appl. No.: 13/787,933

(22) Filed: Mar. 7, 2013

(65) Prior Publication Data
US 2014/0252998 A1   Sep. 11, 2014

(51) Int. Cl.
*B62D 5/04* (2006.01)
*H02P 3/12* (2006.01)
*H02P 3/06* (2006.01)
*B62D 5/00* (2006.01)

(52) U.S. Cl.
CPC .. *H02P 3/12* (2013.01); *H02P 3/06* (2013.01); *B62D 5/0484* (2013.01); *B62D 5/008* (2013.01)

(58) Field of Classification Search
CPC ... H02P 6/085; H02P 7/0038; H02P 21/0032; H02P 21/0035; H02P 3/12
USPC ........... 318/9–12, 14, 15, 106, 109, 159, 436, 318/374, 375, 379, 489
See application file for complete search history.

(56) References Cited

U.S. PATENT DOCUMENTS

| 4,875,539 | A | * | 10/1989 | Abukawa et al. | 180/446 |
| 5,596,252 | A | | 1/1997 | Shimizu et al. | |
| 6,758,110 | B1 | | 7/2004 | Takachi | |
| 7,306,535 | B2 | | 12/2007 | Menjak et al. | |
| 8,170,757 | B2 | | 5/2012 | Furhoff et al. | |
| 2005/0253458 | A1 | * | 11/2005 | Omae et al. | 307/10.1 |
| 2007/0138802 | A1 | | 6/2007 | Stasko et al. | |
| 2008/0177444 | A1 | * | 7/2008 | Tachibana et al. | 701/41 |
| 2011/0000736 | A1 | * | 1/2011 | Oya | 180/443 |

FOREIGN PATENT DOCUMENTS

| DE | 19929428 A1 | 12/2000 |
| DE | 102008033444 A1 | 1/2010 |
| EP | 1350698 A2 | 10/2003 |
| WO | WO-9967119 A1 | 12/1999 |

* cited by examiner

*Primary Examiner* — Bentsu Ro
(74) *Attorney, Agent, or Firm* — Raymond L. Coppiellie; Brooks Kushman P.C.

(57) ABSTRACT

One embodiment of a drive system may include a motor shaft coupled to a gear set in connection between an input shaft and an output shaft. The system may also have a direct current motor selectively holding the motor shaft in a fixed position for engaging the input and output shafts to one another in response to a sudden power loss from a main power supply. The system may further include an auxiliary power supply enabling the direct current motor to provide a resistive torque.

17 Claims, 8 Drawing Sheets

DRIVE SYSTEM WITH A DIRECT CURRENT MOTOR BRAKE

BACKGROUND

Car manufacturers have developed drive systems for various devices and assemblies within a vehicle. As one example, a drive system may be utilized in conjunction with a steering assembly to multiply or divide the turning ratio based on vehicle speed. In particular, the steering assembly may multiply the turning ratio for vehicle speeds below a predetermined minimum threshold when a driver steers the vehicle into or out of a parking spot. In addition, the steering assembly may divide the turning ratio for vehicle speeds above a predetermined maximum threshold when the vehicle is traveling at freeway speeds and minimal steering input can somewhat quickly direct the vehicle toward the intended path. The drive system may include a gear box interconnecting a steering input shaft and a turning output shaft to multiply or divide the turning ratio. The drive system may further include a motor coupled to the gear box to assist with multiplying and dividing the turning ratio. However, the drive systems may have other suitable components utilized in conjunction with various devices and assemblies other than steering assemblies.

A need exists to provide an improved drive system for use with various vehicle systems and assemblies having an electronic motor brake to engage input and output shafts to one another in response to a sudden power loss to the motor.

SUMMARY

One embodiment of a drive system may include a motor shaft coupled to a gear set in connection between an input shaft and an output shaft. The system may also have a direct current motor selectively holding the motor shaft in a fixed position for engaging the input and output shafts to one another in response to a sudden power loss from a main power supply. The system may further include an auxiliary power supply enabling the direct current motor to provide a resistive torque.

Another embodiment of a drive system may include a motor shaft coupled to a gear set in connection between an input shaft and an output shaft. The system may also have a direct current motor having a permanent magnet rotor generating a resistive torque that holds the motor shaft in the fixed position to engage the input and output shafts to one another. In addition, the system may further include a plurality of motor shorting transistors coupled to the direct current motor for generating the resistive torque in the direct current motor in response to a sudden power loss. The system may also have an auxiliary power supply providing power to the plurality of motor shorting transistors.

One embodiment of a process for operating the drive system may include the step of operably coupling a gear set between an input shaft and an output shaft. The process may also include operably coupling the gear set between a motor shaft and the output shaft. Furthermore, the process may include engaging the input shaft and the output shaft to one another by selectively locking the motor shaft in a fixed position. The process may also include actuating a direct current motor to selectively hold the motor shaft in a fixed position in response to a sudden power loss from a main power supply.

DETAILED DESCRIPTION

A drive system may include an electronic motor coupled to a gear set, which may in turn be operably coupled between an input shaft and an output shaft to permit the operation of an assembly or device. For example, a drive system, which may be utilized in conjunction with a steering assembly, may include an input shaft having one end coupled to a steering wheel and an opposite end coupled to the gear set. This drive system may further include an output shaft having one end coupled to the gear set and another end coupled to a steering rack assembly. The drive system may also have an electronic motor, which is coupled to the gear set to multiply or divide a turning output ratio or provide an electronic motor brake engaging the input and output shafts to one another to permit a driver to steer the vehicle in response to a sudden power loss. Of course, however, the drive system may be utilized with any suitable system, assembly or device other than a steering assembly.

An improved drive system may include a power sensor, which detects the sudden power loss, and a controller that actuates an auxiliary switch to supply power from an auxiliary power supply to the electronic motor. In this respect, the electronic motor may generate a resistive torque for holding the motor shaft in the fixed position so as to engage the input and output shafts to one another and operate as a motor brake when, for example, a fuse is blown or a wire is cut.

Figure 1A:
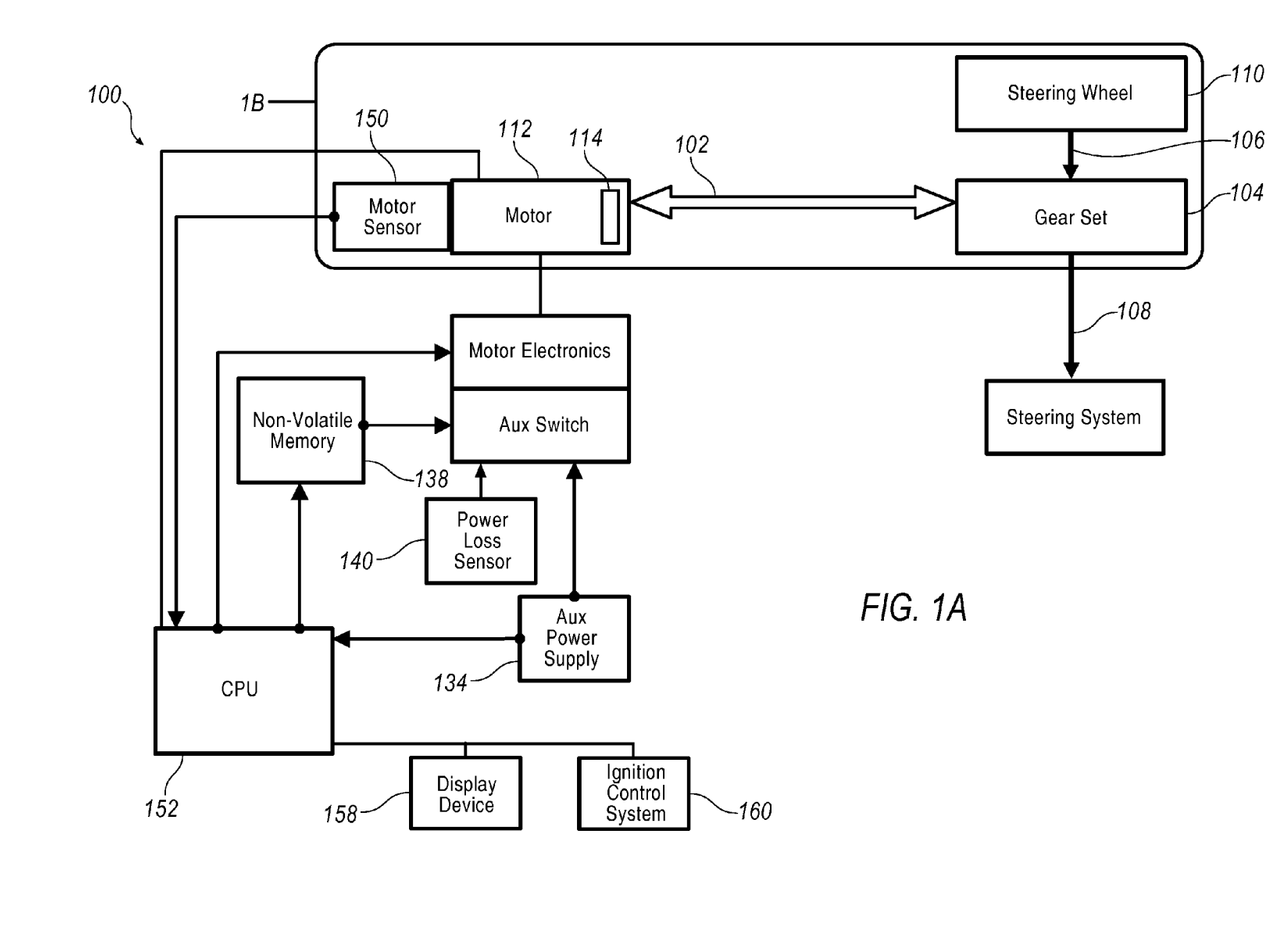
FIG. 1A is a schematic view of one embodiment of a drive system including a direct current motor brake.
Figure 2:
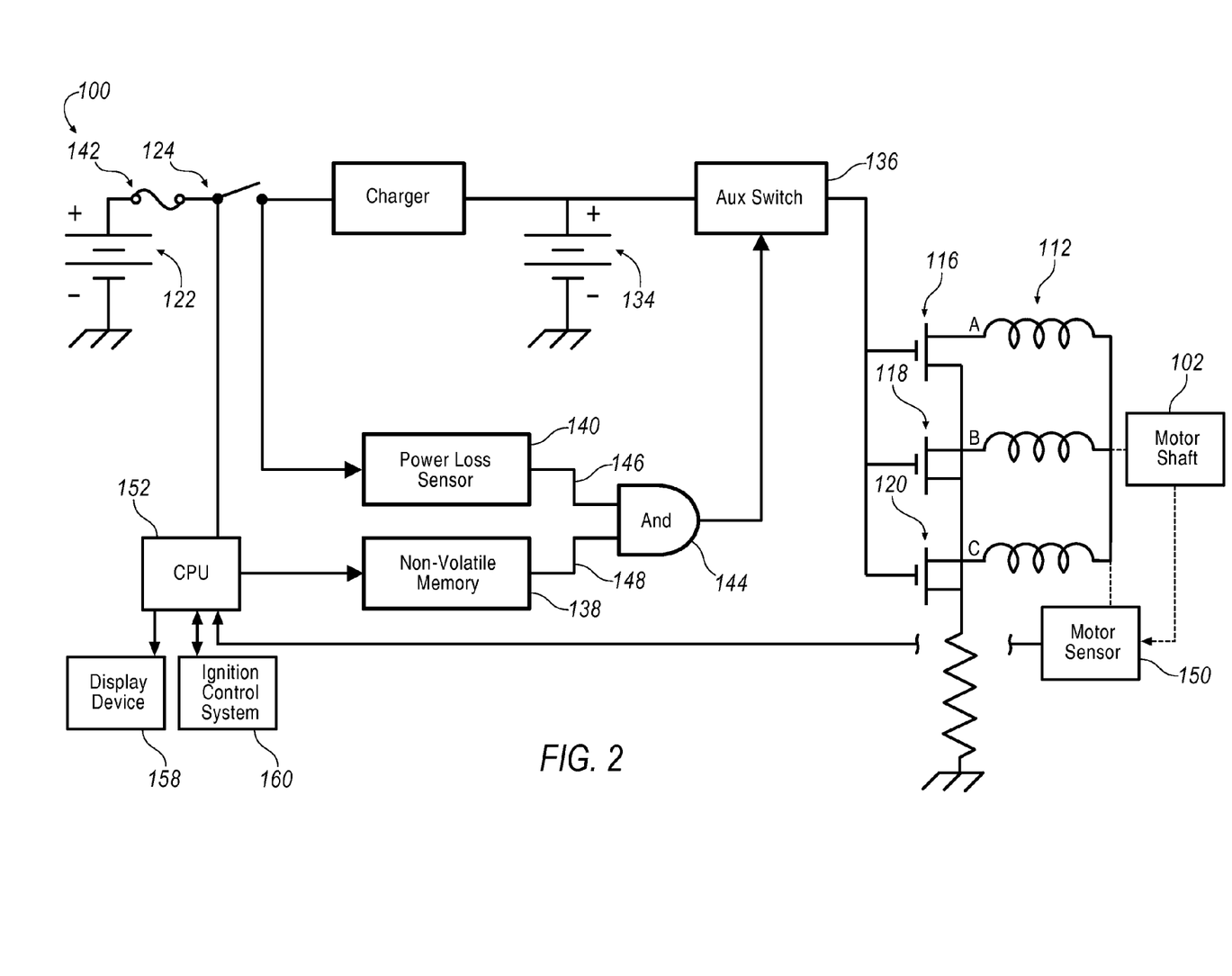
FIG. 2 is a schematic circuit diagram for the system of FIG. 1A.

Referring to FIGS. 1A and 2, one embodiment of a drive system 100 may be utilized in conjunction with a steering assembly. The drive system 100 may include a motor shaft 102 coupled to a gear set 104 that is in connection between an input shaft 106 and an output shaft 108. The input shaft 106 may receive an input from a steering wheel 110, and the motor shaft 102 may be coupled to a direct current motor 112 ("DC motor"), so as to provide turning output through the output shaft and to a steering assembly. The DC motor 112 may have a permanent magnet rotor 114 operably coupled to the motor shaft, such that the motor may generate a highly resistant torque in response to leads 116, 118, 120 of the motor being shorted (FIG. 2).

Figure 1B:
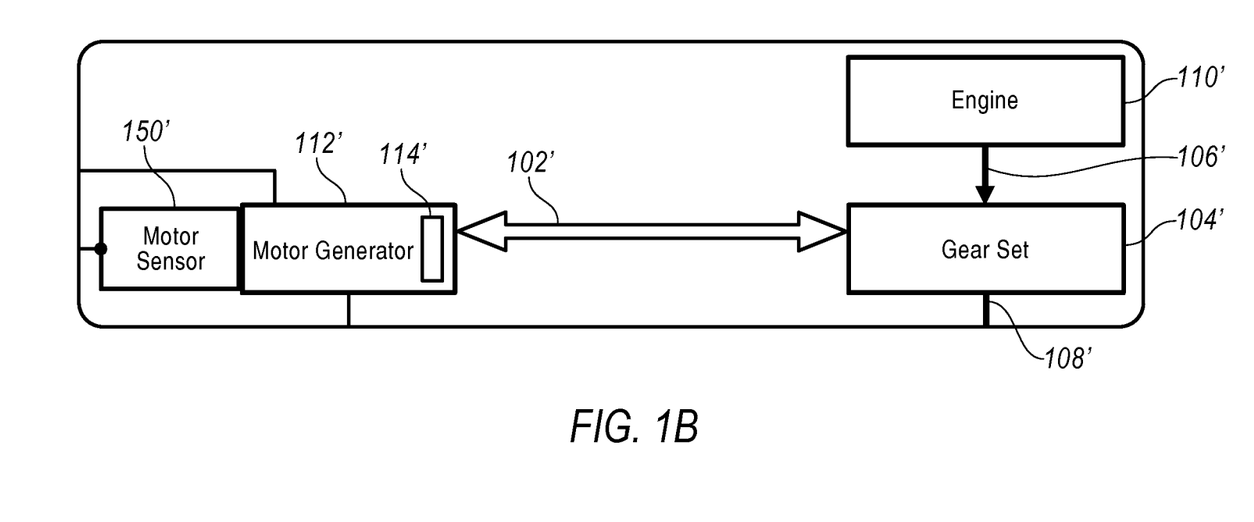
FIG. 1B is a schematic view of another embodiment of a drive system including a direct current motor brake.

As exemplified in FIG. 1B, another embodiment of the drive system 100' may be utilized with a powertrain for hybrid vehicle. In particular, the input shaft 106' may instead be coupled to an engine 110' and the motor shaft may be coupled to a motor generator 112' for a hybrid powertrain. The drive system may be integrated within various systems and assemblies for vehicle or non-vehicle applications.

Referring back to FIG. 2, the system 100 may further have a main power supply 122, such as a main vehicle battery, and a main switch 124 selectively coupling the main power supply to the DC motor. In this respect, the DC motor 112 and steering wheel 110 may provide input to the gear set 104 to either multiply or divide a turning output directed through the output shaft 108 based on, for example, a vehicle speed.

As best shown in FIG. 2, the system 100 may further include an auxiliary power supply 134, such as a backup battery or capacitor, and an auxiliary switch 136 selectively connecting the auxiliary power supply 134 to the DC motor 112 for generating the resistive torque that holds the motor shaft 102 in the fixed position. In particular, the system may further have a plurality of leads or motor shorting transistors 116, 118, 120 coupled to the auxiliary power supply 134 through the closed switch 136, which may in turn generate the resistive torque in the DC motor 112 thereby holding the motor shaft 102 in the fixed position. The system 100 may further include a non-volatile memory 138 for storing an armed electronic motor brake value or a disarmed electronic motor brake value. In particular, before a sudden power loss, the non-volatile memory may store the armed electronic motor brake value therein to pre-arm the system 100, such that an armed signal based on the armed electronic motor brake value may be generated. However, the non-volatile memory may instead store the disarmed electronic motor brake value in response to detecting a normal shutdown of the system without any sudden power loss.

Figure 3A:
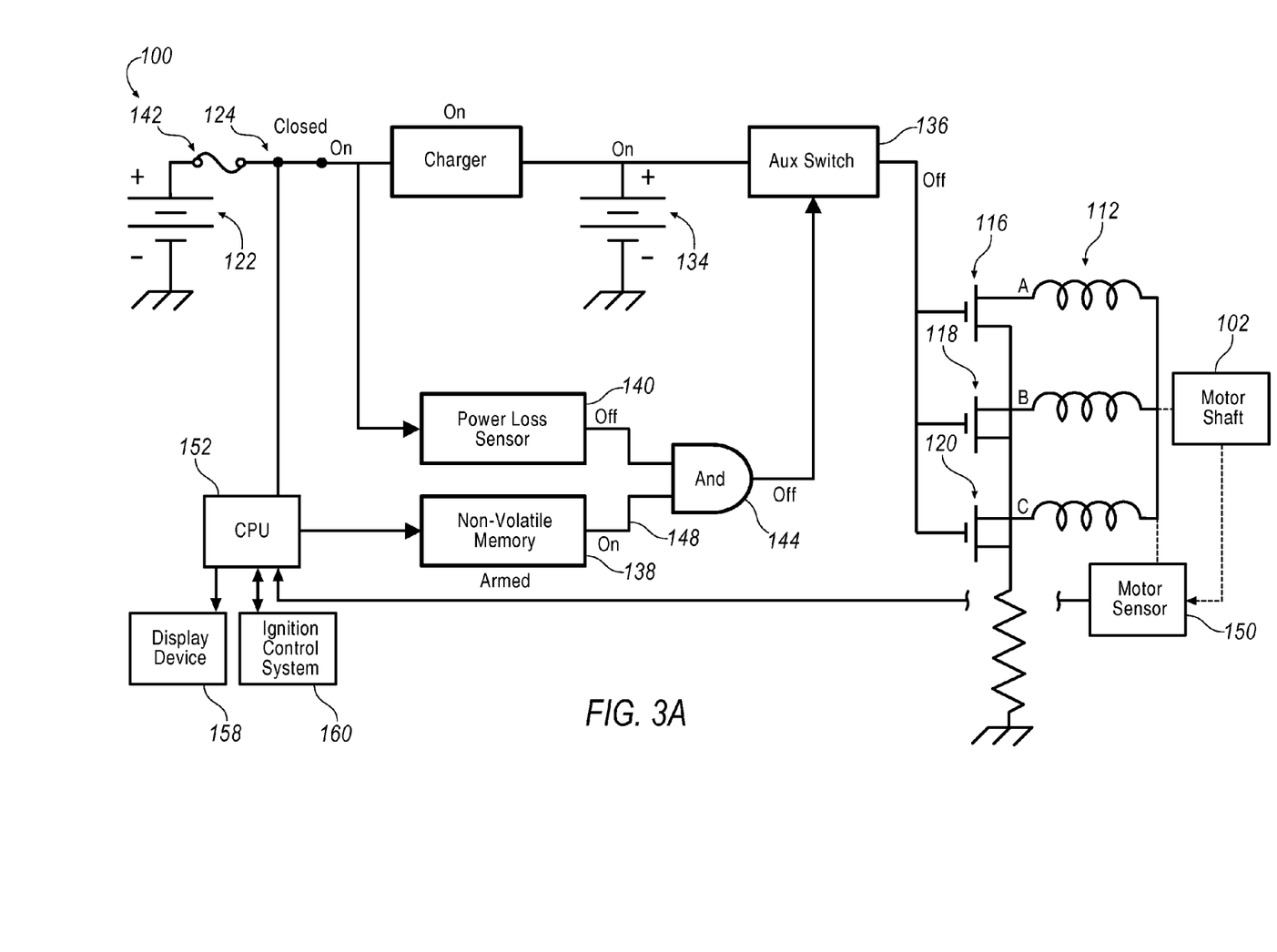
FIG. 3A is a schematic circuit diagram for the system of FIG. 1A, depicting the circuit during normal operation of the drive system including a direct current motor brake in a deactivated condition.
Figure 3B:
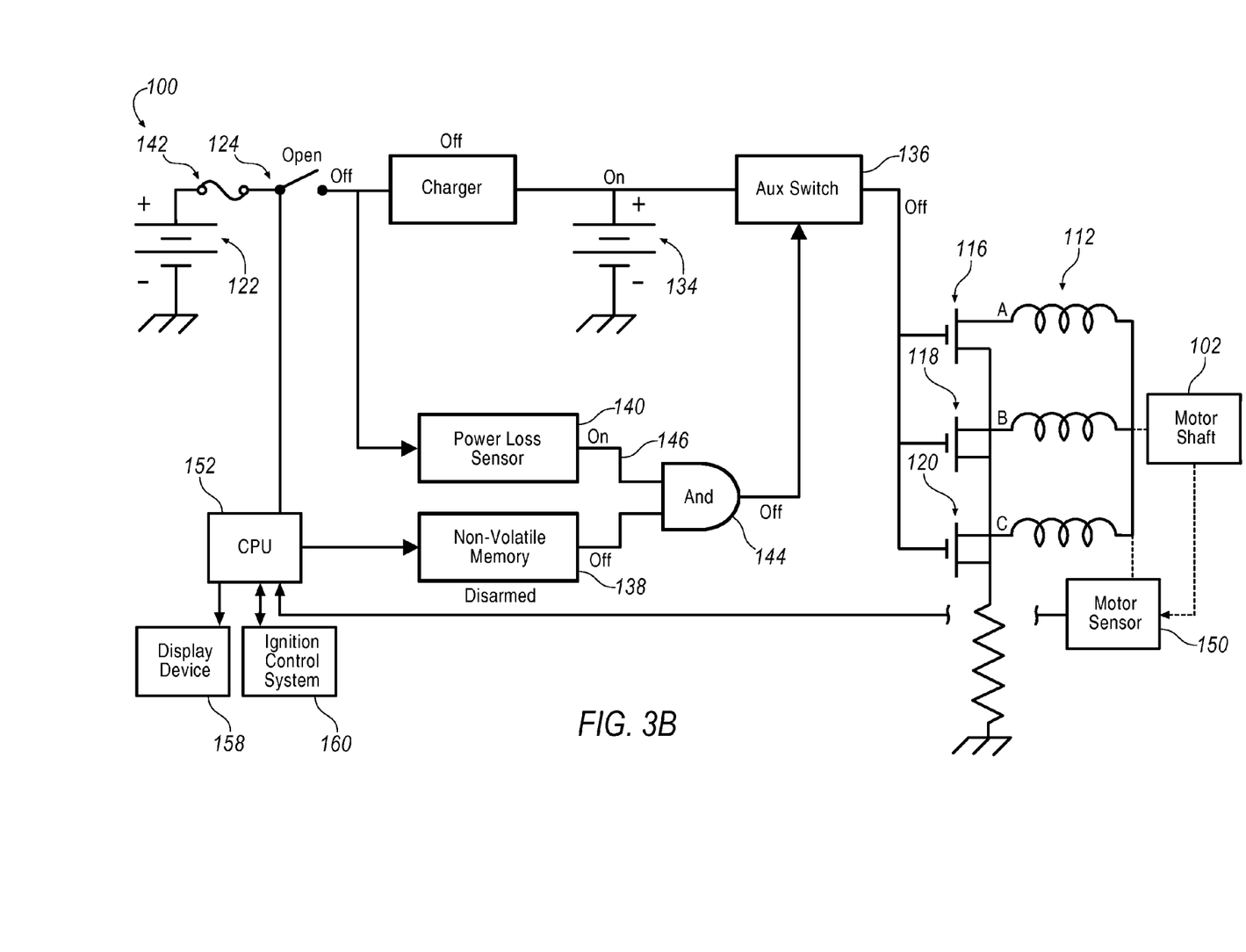
FIG. 3B is a schematic circuit diagram for the system of FIG. 1A, depicting the circuit during normal shutdown of the drive system including a direct current motor brake in a deactivated condition.
Figure 3C:
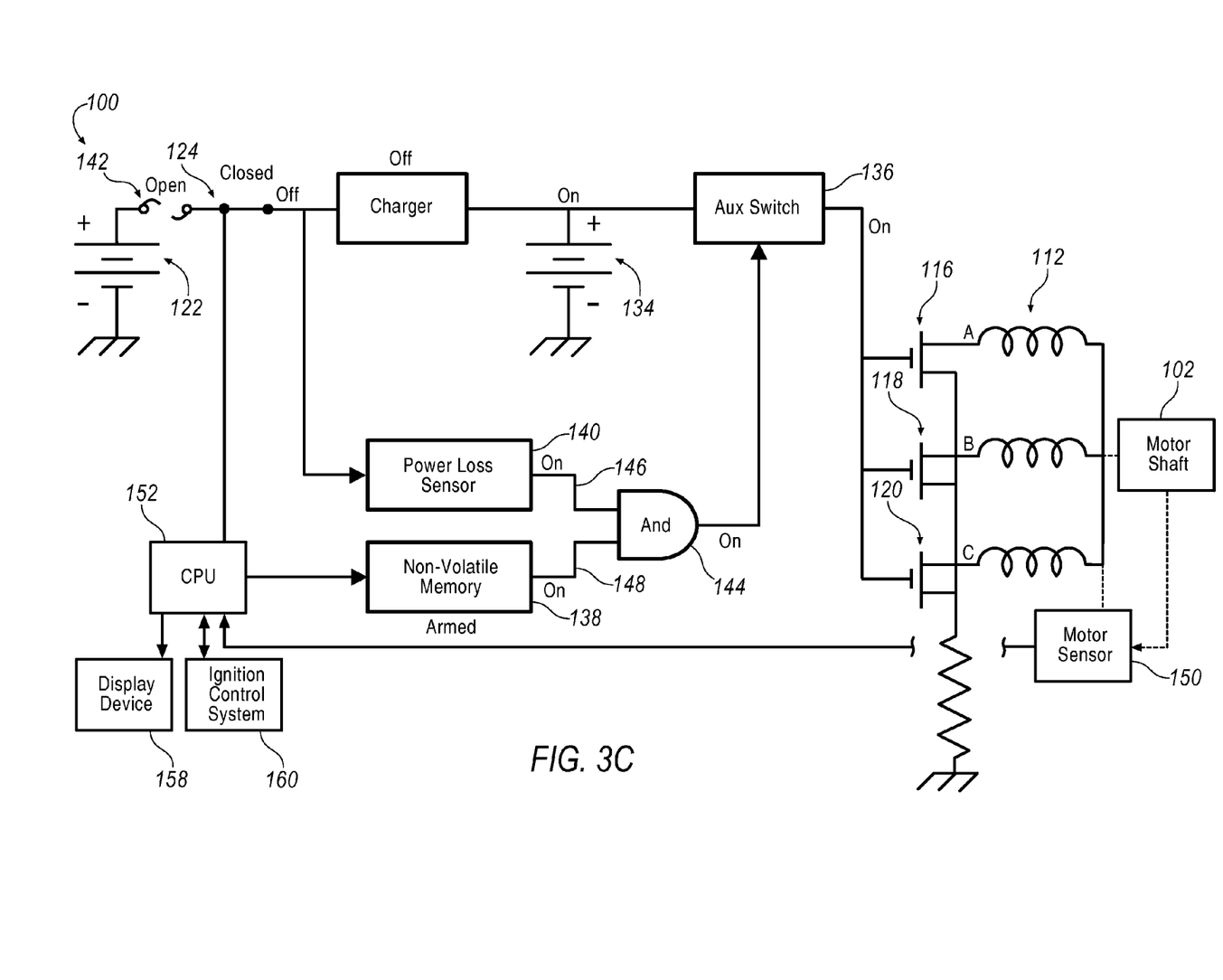
FIG. 3C is a schematic circuit diagram for the system of FIG. 1A, depicting the circuit during a sudden power loss including a direct current motor brake in an activated condition.

The system 100 may also have a power sensor 140 that generates a power loss signal in response to the sudden power loss. For example, the power sensor 140 may detect the failure of a component 142, such as a blown fuse, a cut wire or a dead battery (FIG. 3C). The dead battery may not have any charge and be incapable of being recharged or may be a low or frozen battery, which may not provide the minimum operating voltage for the system if, for example, the vehicle electrical loads exceed the alternator capability while the vehicle is driven. The low or frozen battery may be jumped or recharged to become operable.

As shown in FIG. 2, the system 100 may also have an integrated circuit chip 144 providing a gate coupled to the non-volatile memory 138, the power sensor 140 and the auxiliary switch 136. The gate may close the switch 136 in response to receiving the power loss signal 146 from the power sensor 140 and receiving an armed signal 148 based on the armed electronic motor brake value from the non-volatile memory 138 (FIG. 3C). The IC chip may be a component of the controller or a separate stand-alone processor in the vehicle. FIG. 3A depicts a normal operation of the system 100, in which the auxiliary switch remains open because the power sensor does not generate the power loss signal 146. In addition, during normal operation of the system, the main power supply 122 may charge the auxiliary power supply 134, and the non-volatile memory may have the armed electronic motor brake value stored therein to pre-arm the system in response to a sudden power loss. FIG. 3B illustrates a normal shutdown of the system 100, in which the main switch is opened and the controller overwrites the armed electronic motor brake value with the disarmed electronic motor brake value in the non-volatile memory, thus leaving the auxiliary switch in the open position. FIG. 3C depicts a sudden power loss caused by, for example, a blown fuse cut wire, or a dead battery 142. During the sudden power loss, the gate closes the auxiliary switch 136 in response to receiving the power loss signal 146 from the power sensor 140 and in further response to receiving the armed signal 148 from the non-volatile memory 138. With the auxiliary switch 136 closed, the auxiliary power supply 134 may supply power to the shorting transistors 116, 118, 120 which may in turn cause the DC motor 112 to generate the resistant torque that holds the motor shaft 102 in the fixed position so as to engage the input and output shafts to one another and, in this embodiment, permit the driver to steer the vehicle.

Figure 4:
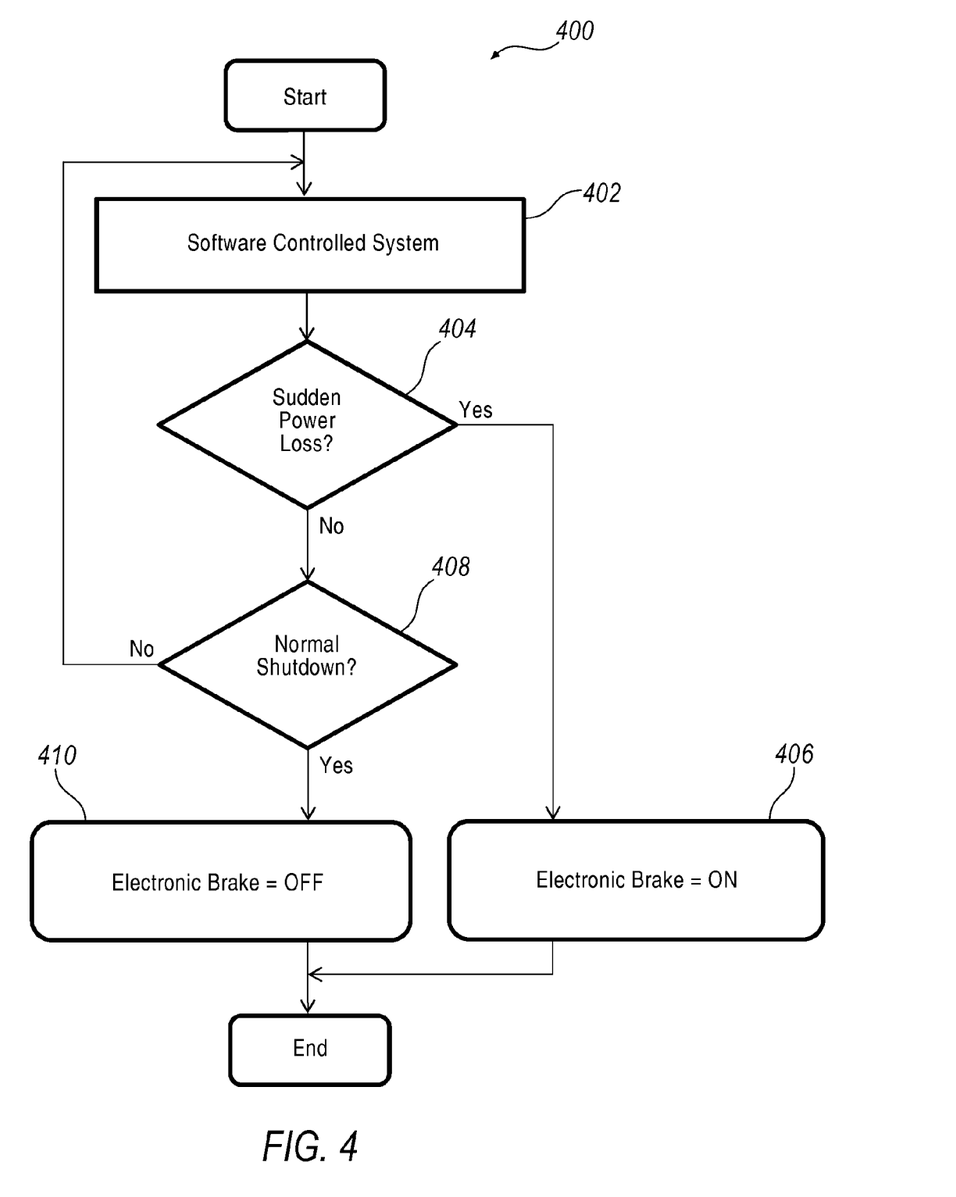
FIG. 4 is a flow chart for one embodiment of a process for operating the drive system of FIG. 1A.

FIG. 4 illustrates an exemplary process 400 of operating the system of FIG. 1. At block 402, a software controlled system may be actuated for normal operation of the system 100 to operably couple the gear set between the input and output shafts and further operably couple the gear set between the motor shaft and the output shaft. In addition, the system may be pre-armed with the non-volatile memory, which stores the armed electronic motor brake value. The normal operation of the drive system 100 is detailed in the flowchart shown in FIG. 5.

In block 404, the system may respond to a sudden power loss. For example, the power sensor 140 may generate a power loss signal indicative of a blown fuse, cut wire or dead battery, and transmit the signal to the gate or the controller. If there has been a sudden power loss, the process may continue to block 406. If there has not been a sudden power loss, the process may continue to block 408.

In block 406, the electronic brake may be activated to hold the motor shaft in a fixed position and engage the input and output shafts to one another. In particular, the gate may receive the armed signal from the non-volatile memory and the power loss signal from the power sensor, so as to close the auxiliary switch and provide power from the auxiliary power supply to the shorting transistors, which may in turn generate a resistant torque in the DC motor 112 for holding the shaft in the fixed position. This feature may permit continued operation of the assembly in the event of a sudden power loss to the DC motor from the main power supply. For example, this feature may permit continued operation of a steering assembly such that the driver may steer the vehicle when the main power supply has been lost.

In block 408, the controller may determine whether a normal shutdown has been requested. If a normal shutdown has been requested, the process may continue to block 410. If, however, a normal shutdown has not been requested, the process may return to block 402.

In block 410, the controller may store the disarmed electronic motor brake value in the non-volatile memory, overwriting the armed electronic motor brake value. In this respect, the electronic brake may not be activated, specifically with the auxiliary switch being maintained in an open position in response to the normal shutdown request.

Figure 5:
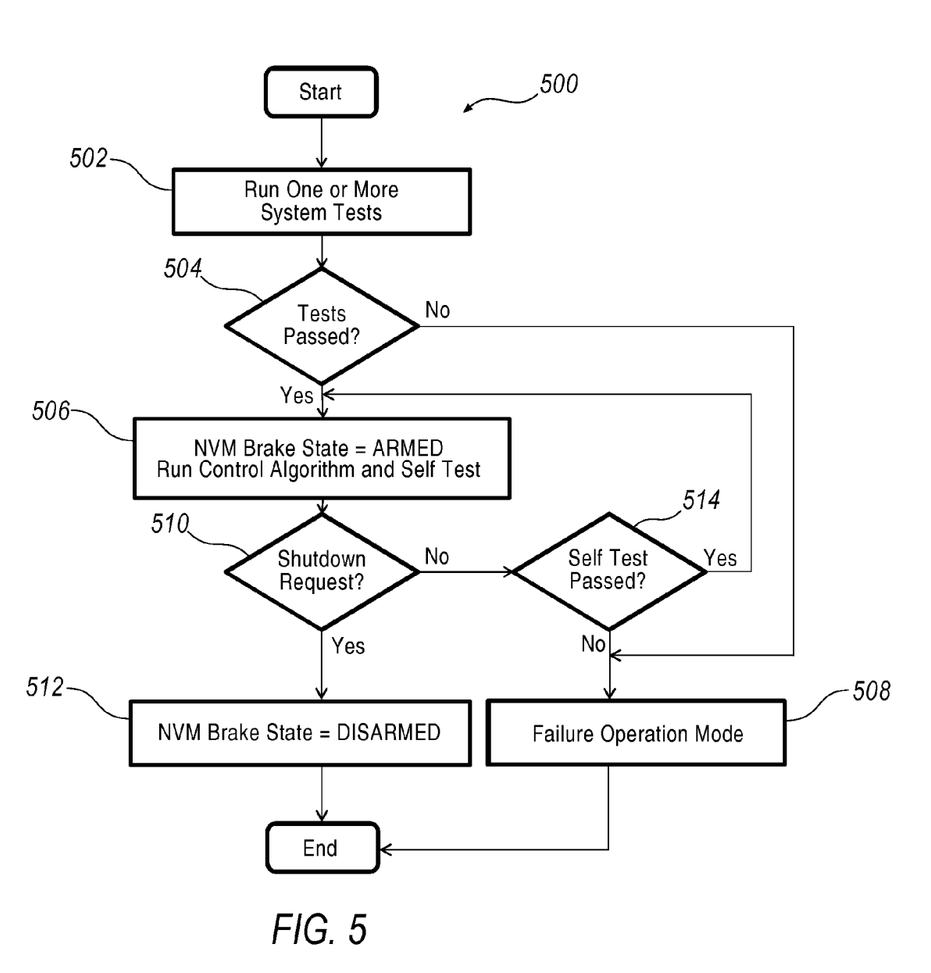
FIG. 5 is a flow chart for one embodiment of a subroutine for the process of FIG. 4.

FIG. 5 illustrates an exemplary subroutine process 500 for block 402 in FIG. 4, illustrating normal operation of the system 100. The process may be performed by various devices, such as by controller 152 or computer processing unit.

At block 502, the system may be initialized by executing one or more tests directed to the operability of the electronic motor brake or any one or more components of the steering assembly utilized in conjunction with the motor brake. The system may be initialized upon one or more sensors detecting a driver inserting a key in the ignition, starting the vehicle engine, moving the key to an "on" position, actuating a driver-side door handle or various other conditions. Each sensor may generate a test signal indicative of the condition of the electronic motor brake or the assembly.

At block 504, the controller may receive the test signals from the respective sensors and determine whether the electronic motor brake or the assembly is in a functional condition. If the controller determines that the both the motor brake and the assembly are in a functional condition, the process 500 may continue to block 506. If the controller determines that the motor brake, the assembly or both the motor brake and assembly are malfunctioning, damaged or otherwise not functioning properly, the process may continue to block 508.

At block 508, the system may proceed into one or more failure operation modes. For example, the controller may generate a failure message signal and transmit the failure message signal to a display device 158. The display device 158 may be a video screen, a light device configured to display a symbol, other suitable communication devices or any combination of these devices. Furthermore, the display device may be integrated within an instrument cluster, a dashboard, a center console, other suitable portions of the vehicle, a handheld device, a remote computer, or any combination of these devices. The display device may display a message indicating an error in the electronic motor brake and/or the assembly. Furthermore, in the failure operation mode, the controller 152 may generate a performance control signal and transmit the signal to an ignition control system of the vehicle. The ignition control system may be disabled in response to the performance control signal. In this respect, the system may inform the driver of the condition of the system to permit repair. However, the system may generate various signals received by various devices and systems in response to the same.

At block 506, the system may proceed into a primary normal operation mode in which the system is disposed in a pre-armed electronic motor braking state for a potential sudden loss of power, which may be caused by a blown fuse, cut wire or dead battery. In particular, the controller 152 may store an armed electronic motor brake value in the non-volatile memory, so as to pre-arm the system with an electronic motor brake during a sudden power loss.

At block 510, the controller may determine whether a request has been made to shut down the system. For example, the controller may determine a system shutdown has been requested, in response to receiving a shutoff signal from the ignition control system when, for example, the transmission has been in park for at least a predetermined period of time after the vehicle has traveled a predetermined distance. If the controller determines that the system shutdown has been requested, the process may continue to block 512. If, however, the controller determines that no request has been made to shut down the system, the process may continue to block 514.

At block 514, the system may execute one or more diagnostics and tests directed to any suitable portion of the motor brake and the assembly. If the controller determines that both the motor brake and the assembly have passed the tests, the process may return to block 506. If the controller determines that the system has not passed one or more of the tests, the process may continue to block 508.

At block 512, the controller may store a disarmed electronic motor brake value to the non-volatile memory. In this respect, the gate will not actuate the auxiliary switch to close, thereby maintaining the electronic brake in a deactivated state.

With regard to the processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed as new and desired to be protected by Letters Patent of the United States is:

1. A drive system, comprising:
    a motor-shaft coupled to a gearset between input and output shafts;
    a DC-motor selectively holding the motor-shaft in a fixed position for coupling the input and output shafts based on a sudden power loss;
    an auxiliary-power-supply coupled to the DC-motor; and
    an auxiliary switch selectively connecting the auxiliary-power-supply to short a plurality of DC-motor leads for generating the resistive torque in the DC-motor that holds the motor-shaft in the fixed position.

2. The drive system of claim 1, further comprising:
    a non-volatile memory storing an armed electronic motor brake value;
    a power sensor generating a power loss signal in response to detecting the sudden power loss; and
    an integrated circuit chip providing a gate coupled to the non-volatile memory, the power sensor and the auxiliary switch;
    wherein the gate may close the auxiliary switch in response to receiving an armed signal based on the armed electronic motor brake value in the non-volatile memory and in further response to receiving the power loss signal from the power sensor.

3. The drive system of claim 2, further comprising:
a controller storing a disarmed signal to the non-volatile memory in response to detecting a normal shutdown without the sudden power loss.

4. The drive system of claim 1, wherein the DC-motor is a generator.

5. The drive system of claim 1, wherein the input shaft receives input from one of a steering wheel and an engine.

6. The drive system of claim 1, wherein the sudden power loss is indicative of at least one of a blown fuse, a cut wire and a dead battery.

7. A drive system, comprising:
a motor shaft coupled to a gear set in connection between an input shaft and an output shaft;
a direct current motor having a permanent magnet rotor generating a resistive torque that holds the motor shaft in the fixed position to engage the input and output shafts to one another;
a plurality of motor shorting transistors coupled to the direct current motor for generating the resistive torque in the direct current motor in response to a sudden power loss; and
an auxiliary power supply providing power to the plurality of motor shorting transistors.

8. The drive system of claim 7, further comprising:
an auxiliary switch selectively connecting the auxiliary power supply to short the plurality of leads of the direct current motor for generating a resistive torque in the direct current motor that holds the motor shaft in the fixed position.

9. The drive system of claim 7, further comprising:
a non-volatile memory storing an armed electronic motor brake value;
a power sensor generating a power loss signal in response to detecting the sudden power loss; and
an integrated circuit chip providing a gate coupled to the non-volatile memory, the power sensor and the auxiliary switch;
wherein the gate may close the auxiliary switch in response to receiving an armed signal based on the armed electronic motor brake value in the non-volatile memory and in further response to receiving the power loss signal from the power sensor.

10. The drive system of claim 7, wherein a controller stores a disarmed signal to non-volatile memory in response to detecting a normal shutdown without the sudden power loss.

11. The drive system of claim 7, wherein the direct current motor is a generator.

12. The drive system of claim 7, wherein the input shaft receives input from one of a steering wheel and an engine.

13. The drive system of claim 7, wherein the sudden power loss is indicative of at least one of a blown fuse, a cut wire and a dead battery.

14. A process for operating a drive system, comprising:
operably coupling a gear set between an input shaft and an output shaft;
operably coupling the gear set between a motor shaft and the output shaft;
engaging the input shaft and the output shaft to one another by selectively locking the motor shaft in a fixed position;
actuating a direct current motor to selectively hold the motor shaft in a fixed position in response to a sudden power loss from a main power supply;
closing an auxiliary switch to direct power from an auxiliary power supply to the direct current motor for generating a resistive torque that holds the motor shaft in the fixed position;
storing an armed electronic motor brake value in a non-volatile memory;
generating a power loss signal by a power sensor in response to detecting the sudden power loss; and
closing the auxiliary switch between the auxiliary power supply and the direct current motor in response a gate in an integrated circuit chip receiving an armed signal based on the armed electronic motor brake value in the non-volatile memory and receiving the power loss signal from the power sensor.

15. The process of claim 14, further comprising:
maintaining the auxiliary switch in an open position between an auxiliary power supply and the direct current motor in response to a normal shutdown request.

16. The process of claim 14, wherein the direct current motor is a generator.

17. The process of claim 14, wherein the input shaft receives input from one of a steering wheel and an engine.

* * * * *